United States Patent Office 2,905,246
Patented Sept. 22, 1959

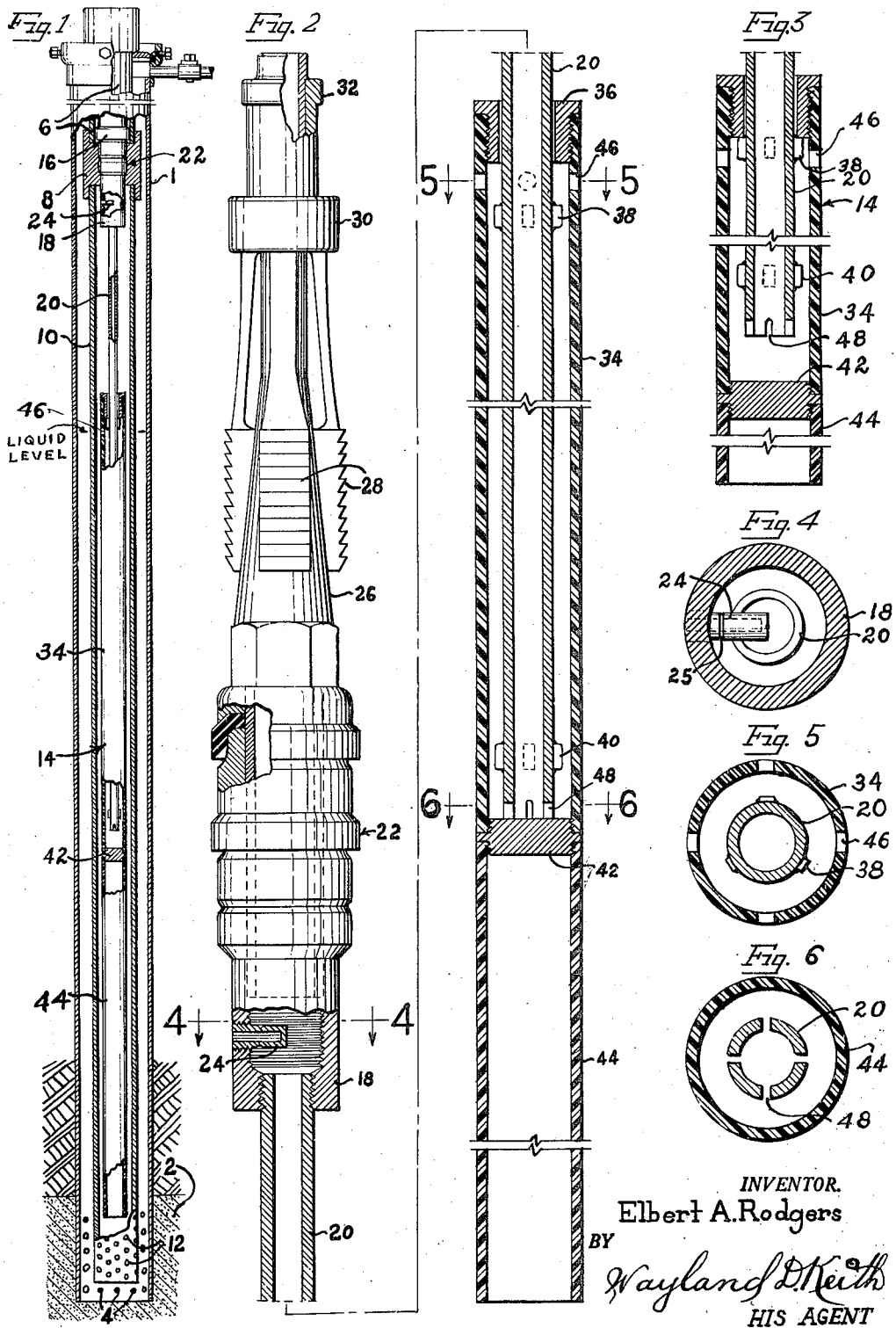

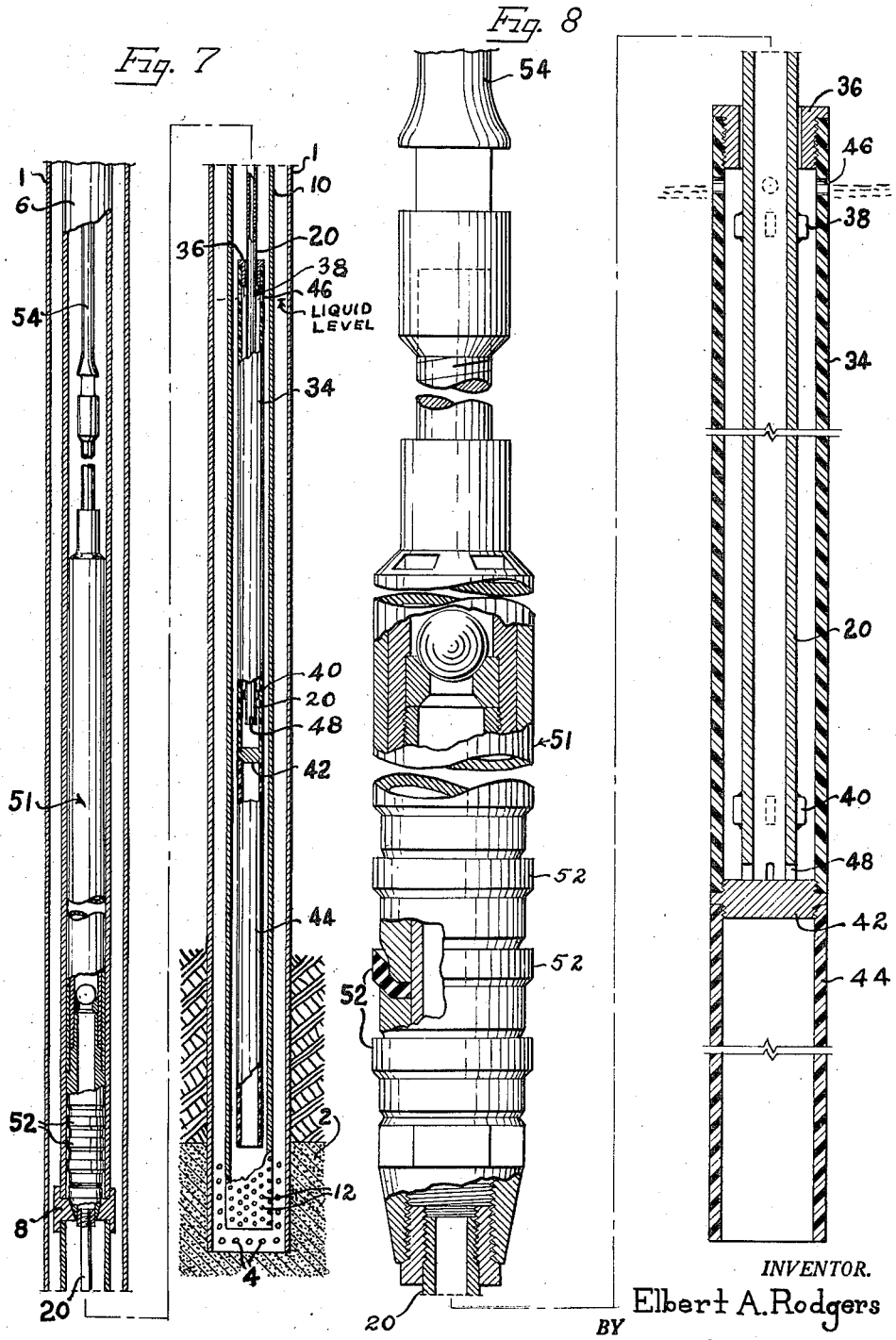

2,905,246
LIQUID LEVEL AND PRESSURE CONTROL VALVE FOR OIL WELLS

Elbert A. Rodgers, Wichita Falls, Tex.

Application August 20, 1956, Serial No. 605,006

7 Claims. (Cl. 166—54)

This invention relates to improvements in fluid level and pressure control flow valves for oil wells, and more particularly to a valve for controlling the fluid level in producing formations, and the flow of the oil into the bore hole of the well to be flowed to the top of the well by gas pressure or to be pumped in accordance with the production indicated in the well.

Various flow devices have been proposed heretofore, but these, for the most part, would allow the oil to be flowed from the producing formation too rapidly, thereby causing a depletion of gas and gas pressure, and ultimately the loss of considerable oil production, due to the fact that oil would be pocketed in the formation without sufficient gas pressure to move the oil to the bore hole of the well, from which it could be produced.

In the present invention the device prevents the rapid depletion of gas pressure, and produces the maximum amount of oil with the minimum depletion of gas in the subterrean reservoir.

An object of this invention is to provide a fluid level and pressure control valve which will prevent the oil and gas in a producing formation from flowing outward therefrom into the bore hole of a well at a too rapid rate.

Another object of the invention is to provide a fluid level and flow control valve for controlling the flow of fluid into the production tubing of an oil well in such manner as to separate the free gas from the oil at the bottom of the tubing, thus permitting the oil to flow upward in the tubing, while restraining the flow of gas therethrough.

Still another object of the invention is to provide a fluid level and pressure control valve which may be used either on flowing wells or on pumping wells.

Yet another object of the invention is to provide a fluid level and pressure control valve that is simple in construction, inexpensive to manufacture, effective in operation, and which will operate over long periods of time with a minimum of attention.

With these objects in mind and others which will become manifest as the description proceeds, reference is to be had to the accompanying drawings in which like reference characters designate like parts in the several views thereof, in which:

Fig. 1 is a vertical sectional view though the lower portion of an oil well, showing the casing, tubing and a fluid level and pressure control valve installed therein, with portions being broken away and shown in full outline, to bring out the details of construction;

Fig. 2 is an enlarged side elevational view showing hold-down slips, pack-off sealing elements, and a fluid level and pressure control flow valve attached thereto, with portions being broken away, shortened, and shown in elevation to bring out the details of construction, and showing the valve in closed position, with portions thereof being shown in section;

Fig. 3 is a fragmentary, longitudinal sectional view taken through the lower portion of the fluid level and pressure control flow valve, with parts being broken away, and parts shortened to bring out the details of construction, and showing the valve in open position;

Fig. 4 is a sectional view taken on the line 4—4 of Fig. 2, looking in the direction indicated by the arrows;

Fig. 5 is a sectional view taken on the line 5—5 of Fig. 2, looking in the direction indicated by the arrows;

Fig. 6 is a sectional view taken on the line 6—6 of Fig. 2, looking in the direction indicated by the arrows;

Fig. 7 is a view similar to Fig. 1, but showing a modified form of the invention having a pump situated therein;

Fig. 8 is a view similar to Fig. 2, but of the modified form of invention which utilizes an insert type pump and showing the fluid level and pressure control flow valve attached to the lower end thereof and showing the valve in closed position.

With more detailed reference to the drawings, the numeral 1 designates the well casing in a bore hole having a producing oil formation 2, which formation is usually of the sand, lime, or conglomerate type which has sufficient porosity to enable the oil to pass out from the formation, usually under gas pressure, into the bore hole of the well. The casing 1 is perforated, as indicated at 4, within the producing formation 2, so as to enable the oil and gas to flow through the perforations 4 into the well casing to be produced from the well, as will be more fully set out hereinafter.

A tubing 6 extends downward within the casing 1, and usually has a seating collar 8 or the like, thereon on the lower end thereof. A perforated tubing 10 attaches to the lower end of seating collar 8, as by screw threads, and extends downward into the casing 1 to a point near the bottom of the well. The tubing 10 has perforations 12 therein, which allow oil to flow thereinto, to rise upward therein, and in and around a flow control valve 14.

The flow control valve, designated generally at 14, is preferably made of light weight material, such as plastic tubing or the like, and is fitted on a tubing 20 on the lower end of a packer element 16. The plastic tubes 34 and 44 are of a material that has no affinity for paraffin or asphalt. An adapter fitting 18 is fitted between the valve 14 and the packer element 16, as will be brought out in greater detail hereinafter. The fluid level and pressure control flow valve 14 has the tubular member 20, which tubular member forms an eduction tube, which is screw threaded into the adapter fitting 18, which adapter fitting screws onto the lower end of a hold-down, pack-off element or pack-off cups designated generally by the numeral 22. The adapter fitting 18 is transversely apertured and has a frangible plug 24 screw threaded thereinto, which plug 24 is hollow and is closed at its inner end, so when screw threaded into the adapter fitting 18, the frangible plug 24 may be broken by means of a sinker bar which may be passed axially downward through hold-down, pack-off element 22 to open a passage therethrough.

With the device as shown in Fig. 2 installed within the tubing of a flowing well and with sufficient fluid in the well to cause the float 34 to rise upward until the upper face of the valve disc 42 comes into contact relation with the lower end of tubing 20, whereupon, the major portion of the fluid from the strata, both oil and gas, is closed off, with only the small slots 48 remaining open, however, the slotted openings 48 are not of sufficient size to permit full flow of fluid from the well, therefore, with the cups 22 in sealing relation with the tubing 10, the normal formation gas pressure will continue to build up, which will cause conical mandrel 26 to expand slip teeth 28 into binding engagement with the inner diameter of tubing 10, and since flowing well pressure often exceeds one thousand pounds, and may be several thousand pounds, the pressure that expands the slips is so great that the slips cannot be retracted until the pressure is released. However, if the gas pressure is equalized on each side of the cup members 22, the slips may be readily retracted and the device may then be readily moved upward within the tubing. Therefore, by lowering a sinker bar into the well through the tubing, by means of a wire line, the inwardly extending, hollow, frangible plug 24, which has a groove intermediate the length thereof, is broken by a jarring action by the sinker bar, whereupon, the gas pressure from below cups 22 will pass upward through the hollow in the plug, which will allow the equalization of the pressure interior tube 20 with the formation pressure. This will also relieve excess upward pressure on cups 22 and conical member 26, and by moving a special tool into place to engage ring 30, the slips 28 may be moved upward so as to disengage the walls of the tubing to allow the tool to be removed from the tubing.

The hold-down, pack-off element 22 has a conical body 26 on which slips 28 slide, so when the pack-off element 22 is lowered into the tubing, a setting tool may be used to move collar 30 downward to lock the slips 28 within the tubing 6. However, when it is desired to remove the pack-off, hold-down element from the tubing, the tool is used to engage annular boss 32 and collar 30, so as to move the slips upward and remove the device from the well. The tubular member 20 is of such length as to extend throughout the length of tubular shell 34. The tubular member 20 passes loosely through a cap 36, which cap is screw threaded into the upper end of tubular shell 34, which tubular member 20 has peripherally spaced bosses 38 therearound a spaced distance upward from the lower end thereof. Bosses 40 are peripherally spaced around and secured to the tubular member 20 near the lower end thereof and a spaced distance from bosses 38. The upper bosses 38 serve as a limit stop to the downward movement of tubular shell 34, as well as a centering guide to maintain the tubular member 20 centrally within the tubular shell 34. The relative movement between the tubular shell 34 and the tubular member 20 determines the opening of the valve, which is formed by the lower end of the tubular member 20 seating on partition 42, which partition 42 is preferably made of a non-magnetic material, such as bronze, plastic or the like, and which partition 42 is screw threaded into the lower end of tubular shell 34 and the upper end of tubular shell 44.

It is preferable to have the tubular shells 34 and 44 made of light weight material, such as thermo-plastics, or the like. The tubular shells 34 and 44 are screw threaded onto the partition 42 and are adapted to move longitudinally of tubular member 20 in unison. Tubular shell 34 has openings 46 formed therein, near the upper end thereof, which openings 46 allow the tubular shell 34 to be filled with liquid. The tubular member 20 has a plurality of orifices 48 therein, which admit a gauged amount of fluid to pass therethrough at all times, to prevent a vacuum seal between the upper face of partition 42 and the lower open end of tubular member 20.

The tubular shell 34 is of greater length than the tubular shell 44. However, the tubular shell 44 is of such buoyancy as to buoy up the weight of tubular shell 34, partition 42, and the tubular shell 44, in the oil that is being produced. However, the tubular shell 34 is of such capacity that, when oil rises upward within perforated tubing 10 and flows through holes 46 into tubular shell 34, to such an extent as to fill the tubular shell 34 with oil, the weight of the oil plus the weight of tubular shells 34 and 44 will cause the partition 42 to move away from the open end of tubular member 20, which will allow a greater volume of oil to flow upward through tubular member 20, until the greater portion of the oil in tubular member 34 is exhausted. However, before the oil in tubular member 34 is completely exhausted therefrom, the tubular member 34 will be buoyed up with tubular member 44 so as to cause the partition 42 to seat against the lower open end of tubular member 20, whereupon, the flow of oil into tubular member 34 will be restricted by orifices 48 to such an extent that gas will not be allowed to escape, whereupon, as the oil from the formation is produced into the bore hole of the well, the oil will rise up and again fill tubular shell 34 to repeat the cycle.

Modified form of invention

A modified manner of practicing the invention is illustrated in Figs. 7 and 8, which show a plunger pump in connection with the device, which plunger pump is of the insert type.

The numeral 51 designates generally, a plunger pump of the insert type, which has cups 52 thereon to frictionally engage with the inner walls of a working barrel, seating nipple or the like. The lower end of the pump wedgingly engages within a seating collar 8 in the manner set forth in the preceding form of the invention. The tubular member 20 threadably engages the lower end of pump 51 and remains stationary, while sucker rods 54 are reciprocated by means of a pump jack in the usual manner. It is preferable to place shells 34 and 44 at a lower level in pumping wells, than in flowing wells, and, as oil, from the producing formation, flows into the bore hole of the well through perforations 4, the oil level will rise in such manner as to seek the static level, in event there is no material gas pressure, whereupon, the tubular shell 44 will buoy up until the upper face of partition 42 will seat on the lower open end of tubular member 20, which will close the major outlet opening through tubular member 20. As the oil continues to rise in tubular member 10, it will flow through openings 46 in the upper end of tubular shell 34, so as to fill tubular shell 34 to sufficient height, so that the weight of the oil plus the weight of tubular shells 34 and 44 will cause the partition 42 to move away from the lower open end of tubular member 20, to permit oil to be drawn upward through tubular member 20 by suction exerted by pump 51 thereon.

The stroke of the pump, and other variables may be so regulated, that the pump will continue to withdraw oil from shell 34 without pumping off the fluid head in the reservoir, that is, the producing formation. However, when the oil becomes exhausted from shell 34 to such an extent that tubular shells 34 and 44 are buoyed upward until the upper face of partition 42 closes the upper end of tubular member 20, the flow of oil will be restricted to that drawn through orifices 48, which will be a sufficient amount to lubricate the pump plunger of the insert pump, which is attached to the pump rod and reciprocates therewith, thereby preventing the pump parts from becoming scored or galled because of lack of lubrication.

The form of the invention, as shown in Figs. 7 and 8, is substantially the same in all respects, as that shown in Figs. 1 through 6, except, it is not necessary, in the modified form, to have the frangible plug 24 within adapter fitting 18.

It is to be pointed out that the guide lugs 38 and 40, on tubular element 20, may be welded thereonto, after bushing 36 is telescoped over tubular member 20, or the bushing 36 may be made in complementary halves and screw threaded into the upper end of tubular shell 34, so as to hold these complementary halves together in close fitting relation.

Having thus clearly shown and described the invention what is claimed as new and desired to be secured by Letters Patent is:

1. In an apparatus for producing oil from a fluid bearing formation, a tubular member adapted to be anchored in the fluid producing string of pipe in a well, means forming a fluid tight seal between said production string of pipe and said tubular member, an enlarged tubular member of lesser diameter than the fluid producing string of pipe telescoped over said downwardly extending tubular member, a bushing within said enlarged tubular member and surrounding said downwardly extending tubular member in sliding relation, lugs on said downwardly extending tubular member below said bushing for limiting the downward movement of said enlarged tubular member with respect to said downwardly extending tubular member, said enlarged tubular member having lateral openings formed therethrough near the upper end thereof, a closure fitted in the lower end of said tubular member and forming a valve seat for said downwardly extending tubular member, a second enlarged, imperforate tubular member secured below said first mentioned enlarged tubular member, which second enlarged tubular member extends downwardly and forms an open bottom float of sufficient buoyancy to buoy up said first mentioned enlarged tubular member until it contains a predetermined amount of liquid therein to move said float downward to move said valve seat downward from the lower end of said downwardly extending tubular member.

2. The device as set forth in claim 1, wherein the wall of said downwardly extending tubular member has a passage formed therein near the lower end thereof to admit a lesser amount of oil from said fluid bearing formation therethrough when said valve seat is seated against the lower end of said downwardly extending tubular member.

3. The device as set forth in claim 2, wherein the passage in said downwardly extending tubular member comprises at least one slot in the lower end of said tubular member.

4. The device as set forth in claim 1, wherein said enlarged tubular members are formed of light density material.

5. The device as set forth in claim 1, wherein said enlarged tubular members are formed of a plastic material.

6. The device as defined in claim 1, wherein a frangible, hollow plug, which is closed at its inner end, which frangible, hollow plug is fitted in said tubular member transversely thereof with the inner closed end projecting into the opening of said tubular member, which frangible plug has an open outer end to the outside of said tubular member so when said frangible plug is ruptured a passage will be formed between the outside of said downwardly extending tubular member and the inside of said tubular member, to enable the pressure to equalize therebetween.

7. A liquid trap for use in the bore hole of a well having a string of tubing mounted therein, comprising an eduction tube mounted within said tubing in sealing relation thereto and having an open lower end, an enlarged tubular member surrounding the lower end of the eduction tube in annular spaced relation thereto and being mounted slidably on said tube for limited longitudinal movement with respect thereto, a partition mounted within the tubular member intermediate the length thereof and adjacent the open lower end of the eduction tube for defining an upper chamber and a lower chamber in said tubular member, said upper chamber being in communication with the bore hole of the well through a passage formed in the tubular member at the upper portion of the upper chamber, said lower chamber being sufficiently buoyant in the liquid in the well to buoy up the weight of the tubular member, which member will normally move downwardly when the liquid is introduced into the upper chamber to a predetermined height, and said eduction tube having orifices in the lower end thereof for allowing a gauged quantity of fluid to flow continuously therethrough into the eduction tube when the partition is in contact with the lower end of the tube, said partition being movable away from the orifices upon downward movement of said tubular member to admit a larger quantity of the fluid into said tube.

References Cited in the file of this patent

UNITED STATES PATENTS

| | | |
|---|---|---|
| 1,964,912 | Halliburton | July 3, 1934 |
| 2,128,475 | Rodgers | Aug. 30, 1938 |
| 2,142,376 | Rodgers | Jan. 3, 1939 |